United States Patent
Balazs et al.

(10) Patent No.: US 7,543,957 B1
(45) Date of Patent: Jun. 9, 2009

(54) THERMAL MANAGEMENT OF LEDS INTEGRATED TO COMPACT FLUORESCENT LAMPS

(75) Inventors: Laszlo Balazs, Godollo (HU); Istvan Maros, Budapest (HU); Attila Agod, Dunakeszi (HU); Jozsef Fulop, Budapest (HU); Janos Orban, Veresegyhaz (HU); Gabor Schmidt, Kecsked (HU); Istvan Peter Bakk, Torokbalint (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/021,880

(22) Filed: Jan. 29, 2008

(51) Int. Cl.
*F21V 33/00* (2006.01)

(52) U.S. Cl. ............... 362/264; 362/580; 362/263; 362/228; 362/231

(58) Field of Classification Search ............ 362/555, 362/800, 580, 263, 264, 265, 228, 230, 231, 362/294
See application file for complete search history.

(56) References Cited

U.S. PATENT DOCUMENTS

| | | | |
|---|---|---|---|
| 6,400,104 B1 | 6/2002 | Ham | |
| 6,666,567 B1 | 12/2003 | Feldman et al. | |
| 7,160,012 B2 | 1/2007 | Hilscher et al. | |
| 7,334,932 B2* | 2/2008 | Klettke | 362/612 |
| 2004/0208019 A1* | 10/2004 | Koizumi et al. | 362/545 |
| 2005/0099108 A1 | 5/2005 | Hofmann et al. | |
| 2005/0105302 A1* | 5/2005 | Hofmann et al. | 362/555 |
| 2005/0265023 A1 | 12/2005 | Scholl | |
| 2006/0023447 A1 | 2/2006 | Justel et al. | |
| 2006/0061300 A1 | 3/2006 | Biebl et al. | |
| 2007/0081780 A1 | 4/2007 | Scholl | |

FOREIGN PATENT DOCUMENTS

| | | |
|---|---|---|
| DE | 198 29 270 A1 | 1/1999 |
| DE | 200 07 134 U1 | 9/2000 |
| JP | 10-275600 | 10/1998 |
| JP | 2004 10344 A | 2/2004 |
| JP | 2004 165105 A | 10/2004 |
| WO | WO 02/062106 A1 | 8/2002 |
| WO | WO 2004/036618 A1 | 4/2004 |
| WO | WO 2007/006265 A1 | 1/2007 |
| WO | WO 2007/006266 A1 | 1/2007 |
| WO | WO 2007/113751 A1 | 10/2007 |

* cited by examiner

*Primary Examiner*—Laura Tso
(74) *Attorney, Agent, or Firm*—Fay Sharpe LLP

(57) ABSTRACT

A light-source assembly includes a low-pressure fluorescent discharge tube arrangement having a cold spot temperature and radiating white light and at least one light-emitting diode radiating red light. An operating circuit supplies current to the discharge tube arrangement and the light-emitting diode. An outer envelope surrounds at least the discharge tube arrangement and provides a substantially homogenous light resulting from a mixture of the light radiated by the discharge tube arrangement and the light radiated by the light-emitting diode. A base mechanically and electrically connects at least the discharge tube arrangement in the outer envelope to a lamp-holder.

23 Claims, 6 Drawing Sheets

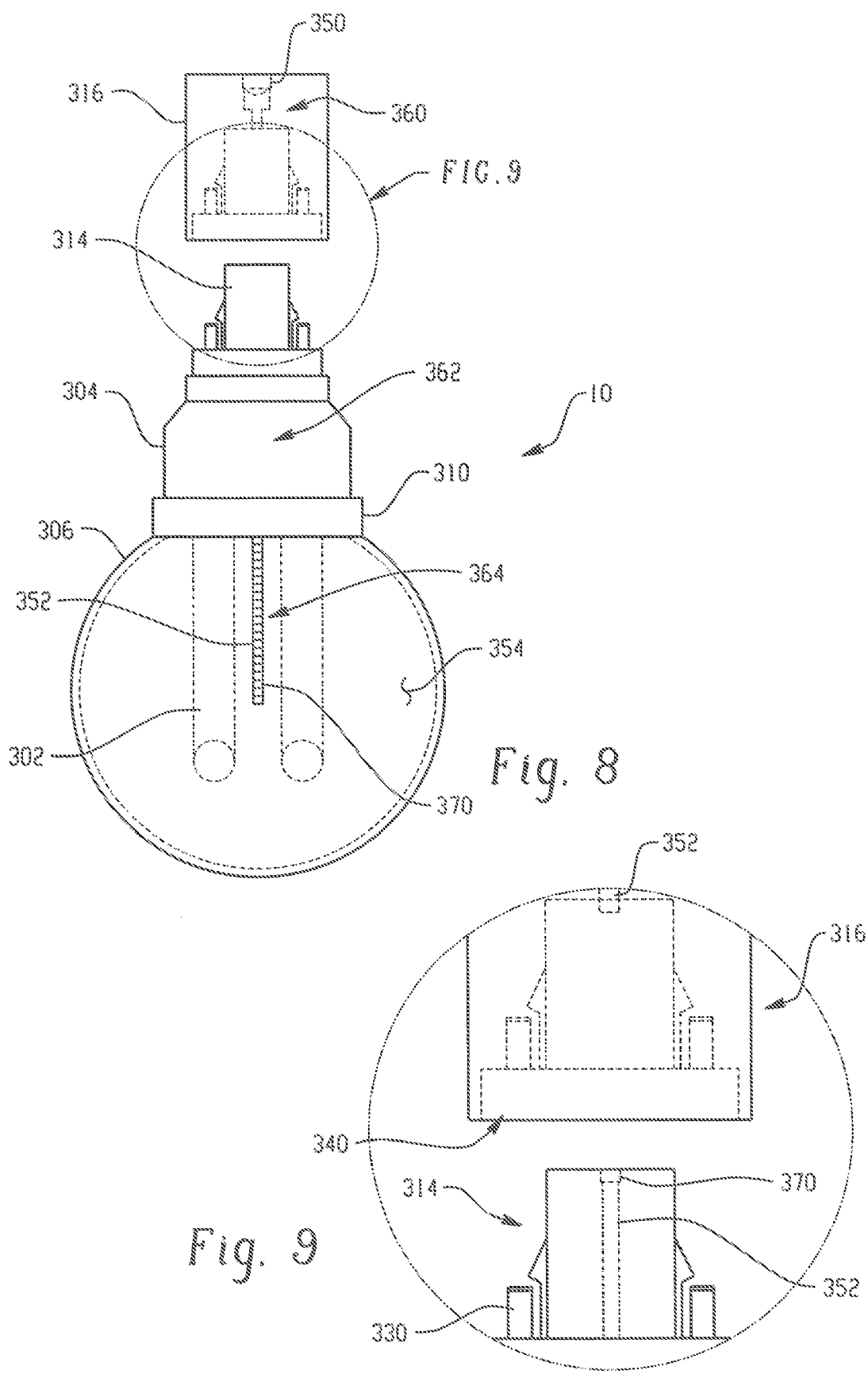

THERMAL MANAGEMENT OF LEDS INTEGRATED TO COMPACT FLUORESCENT LAMPS

BACKGROUND

The present invention relates to a compact fluorescent lamp assembly, and more particularly, to an LED integrated compact fluorescent lamp assembly.

Prior art solutions to low color rendering of compact fluorescent lamps (CFL) have concentrated on optical properties, phosphors, CRI, etc. Although full spectrum fluorescent lamps exist, these lamps have low lumens per watt (LPW), poor color and lumen maintenance, or low color rendering of the color red. Therefore, the red containing colors seem significantly different when illuminated by a conventional CFL compared to an incandescent lamp or natural sunlight. For example, certain colors lack the vivid, very apparent red color with conventional CFL light sources. There are high color rendering CFLs in the market that use phosphors to address the desired color rendering.

Unfortunately, the phosphor solution for enhancing color quality is inadequate because the discharge deteriorates the phosphor and the lumen maintenance and color stability of these lamps do not meet customer requirements.

Adding a small portion (approximately 5-10% of the white light produced by the CFL) of red light produced by a light-emitting diode ("LED") based light source to the white light provided by the CFL is another solution to enhance the red color rendering.

On the other hand, adding the red color via an LED encounters issues because currently available high efficiency red LEDs are temperature sensitive. The lumen output of the LED decreases significantly upon increasing ambient temperature. For example, warming to 80 C, the efficiency and lumen output of the LED decreases to approximately half of the values measured at 25 C. Unfortunately, the working temperature of a low-pressure fluorescent discharge tube or CFL is approximately 80-110 C, and the surrounding components (e.g., outer bulb and ballast) are heated to approximately 60-70 C by heat conduction and convection. Thus, the LED has to be thermally insulated from the CFL, and the heat produced by the LED (approximately 1-3 W) has to be dissipated in order maximize the efficiency and lumen output of the LED.

As a result, a need exists for a lamp assembly that provides light mixing and thermal management solutions of an LED light source that is combined with a CFL light source in order to improve light quality and color rendering with a desired useful life.

SUMMARY

A light-source assembly comprises a low-pressure fluorescent discharge tube arrangement radiating white light and at least one LED radiating red light that is intermixed with the white light, and the assembly effectively addresses thermal management properties to enhance the efficiency and lumen output of the LED.

The assembly further includes a base that includes a metal portion that mechanically and electrically connects at least the discharge tube arrangement to a lamp-holder.

The light-emitting diode in one embodiment is disposed in the base, and the light radiated by the LED diode is conducted to a vicinity of the discharge tube arrangement in the outer envelope by at least one light-guide.

In another embodiment, a heat sink dissipates the heat generated by the LED. The LED preferably contacts the heat sink, and the heat sink contacts the metal portion of the base to effectively convey heat from the LED.

In another embodiment, the LED is disposed in the lamp-holder. The LED light is conducted to a vicinity of the discharge tube arrangement by a light-guide assembly extending through the base.

A primary benefit of the present disclosure relates to improved color rendering associated with a CFL light source.

Another advantage of the present disclosure resides in the improved thermal management.

Yet another benefit is associated with improved integration of LEDs integrated with the CFL.

Still other benefits and advantages of the present disclosure will become apparent from reading and understanding the following detailed description.

BRIEF DESCRIPTION OF THE DRAWINGS

FIG. 8 is a schematic view of an LED integrated fluorescent lamp assembly according to another aspect of the present disclosure.

FIG. 9 is a partial enlarged view of FIG. 8.

DETAILED DESCRIPTION OF THE PREFERRED EMBODIMENTS

Figure 1:
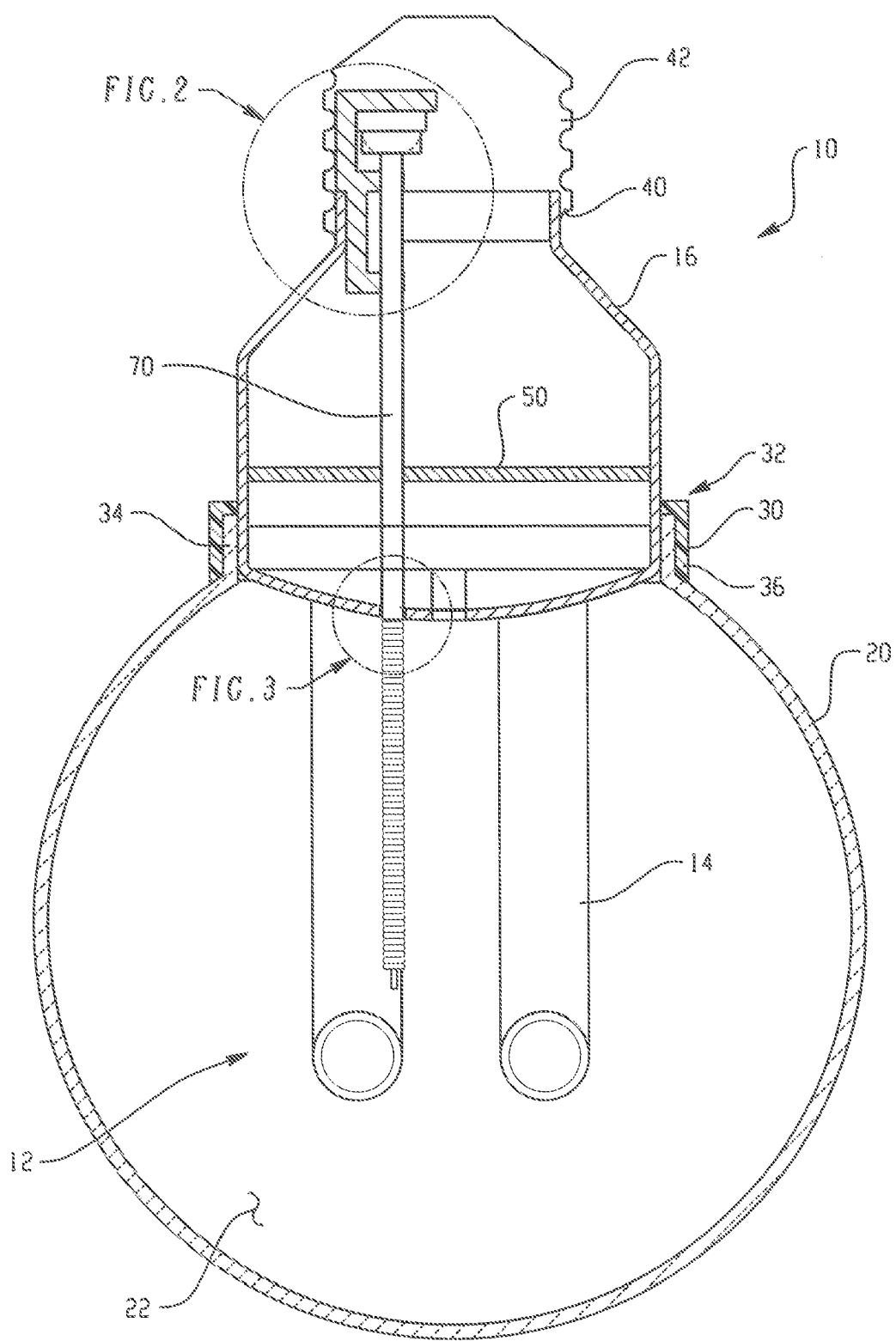
FIG. 1 is a schematic view of an LED integrated fluorescent lamp assembly according to one aspect of the present disclosure.
Figure 2:
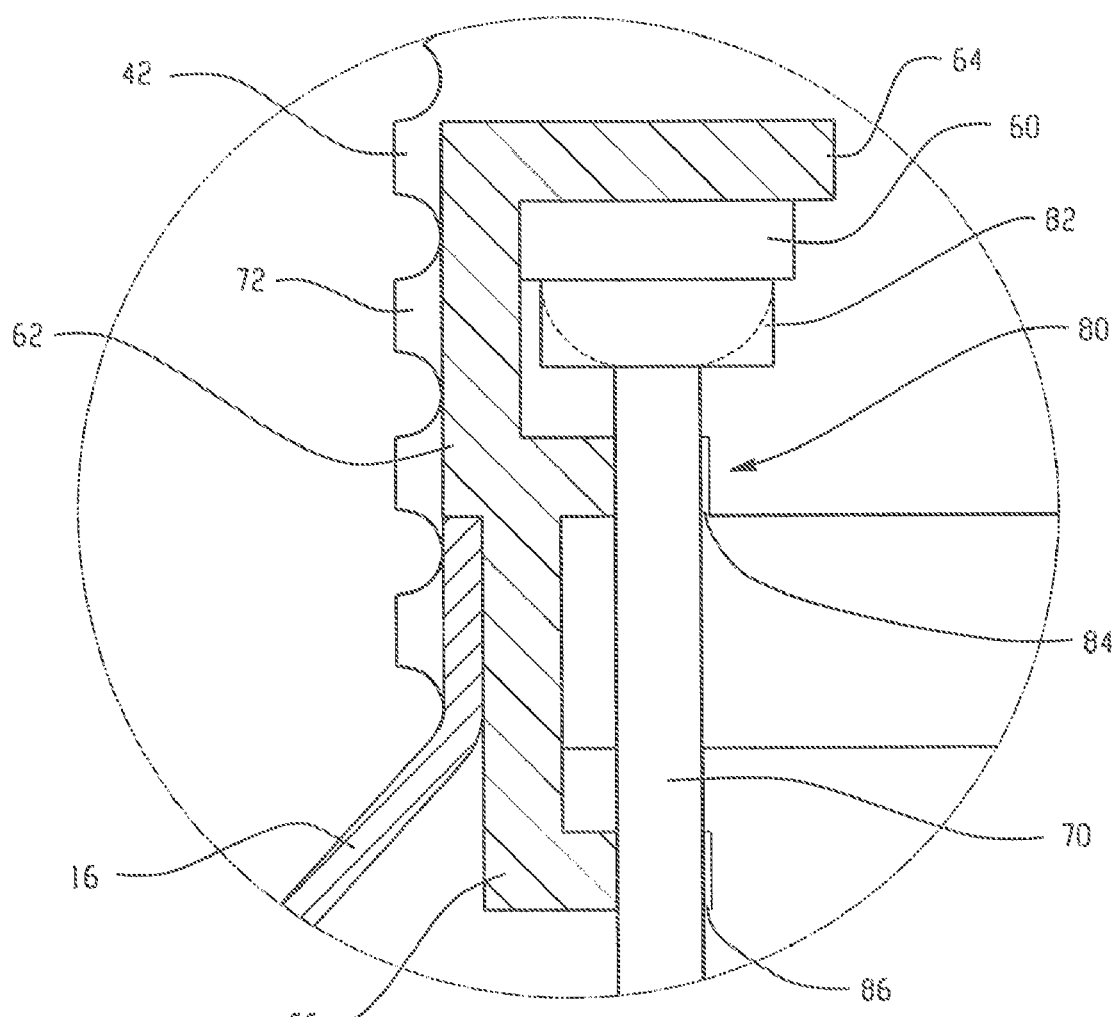
FIG. 2 is a partial enlarged view of FIG. 1.
Figure 3:
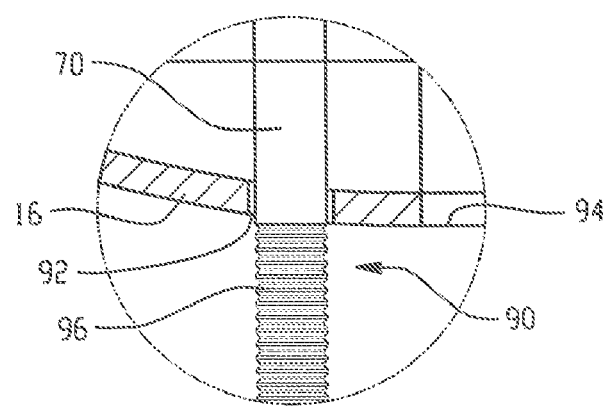
FIG. 3 is a partial enlarged view of FIG. 1.

Referring now to the drawings, wherein like numerals refer to like parts throughout the several views, FIGS. 1-3 illustrate an LED integrated compact fluorescent lamp ("CFL") assembly 10 according to one aspect of the present disclosure. The assembly generally comprises a low-pressure fluorescent discharge lamp arrangement 12 including at least one low-pressure discharge tube 14 attached to a housing or shell 16, typically formed from plastic. In the depicted embodiment, the CFL assembly includes two generally U-shaped low-pressure discharge tubes 14, each discharge tube radiating white light (3000K-4000K, 480-1200 lm). Of course, it will be appreciated that other fluorescent lamp arrangements could be used such as a helical discharge tube having an elongated path and in a manner that is generally well known in the art as will be evident in other embodiments described herein. The discharge tube arrangement 12 and shell 16 can be assembled together as a single element.

An envelope such as glass envelope or outer bulb 20 encompasses the fluorescent discharge lamp arrangement 12 in this illustrated embodiment, however, it will be appreciated that the outer envelope is not present in all intended end uses of this disclosure. The outer envelope is preferably made of a light-conducting material, such as glass or a light-transmissive plastic material. The outer envelope 20 envelops a physical volume 22, which can be, for example, evacuated or provided with a gas fill. As shown, the outer envelope is fixed to the shell 16 by a plastic collar 30 although alternate manners for attaching the outer envelope to the shell are contemplated. The collar is in turn attached to a first end section 32 of the shell 16 and extends outwardly from the shell to define an annular space 34 for receiving therein an open end portion 36 of the outer envelope. The outer envelope is fixedly secured to the plastic shell and collar. A second open end section 40 of the shell 16 is attached to a conductive metal base 42, which is shown in the form of a conventional Edison-type screw base. The base serves the purpose of mechanically holding, and acting as an electrical connection to, an associated lamp fitting or lamp holder (not shown).

Lamp electronics such as an electronic ballast 50 are preferably located within the shell 16 of the embodiment of FIGS. 1-3. As is well known, the ballast 50 supplies the necessary power electronics, power supply, and circuit conditions (voltage, current and wave form) to drive or power the fluorescent discharge tubes 14. Further, a heat reflector/insulator (not shown) may be positioned between the ballast 50 and the shell. The heat reflector shields the heat-sensitive electronic components of the ballast from the heat generated by the low pressure discharge lamp, and thereby extends the useful life of the lamp.

With additional reference to FIG. 2, at least one light-emitting diode ("LED") light source 60 is mounted to the base 42 by a support 62 which is in contact with a wall of the base. In this particular instance, the support 62 is preferably a heat conductive material such as metal in order to efficiently and effectively transfer heat away from the LED light source to the surrounding environment. The LED 60 is preferably a red light emitting LED (620-650 nm, 25-60 lm). An elongated light guide 70 is mounted in optical communication with a light emitting surface of the LED. In the depicted embodiment, the support 62 includes a first portion or arm 64 for housing the LED and a second portion or pair of spaced arms 66 for supporting the at least one light guide 70. The support is located in the base and engages an inner surface 72 of the base and the second end section 40 of the shell 16 to axially locate the support in the lamp assembly. The second portion 66 of the support extends axially outward from the threaded base and into the shell. In this manner, the light guide 70 is supported at axially spaced locations to advantageously provide plural support points along one end of the light guide as it extends into the envelope.

As indicated previously, high efficiency LEDs which radiate red light are temperature sensitive. Thus, controlling the temperature of the LED is an important aspect of optimum performance of LED systems. In general, the cooler the environment, the higher the light output from an LED. Higher temperatures generally reduce light output. In warmer environments and at higher currents, the temperature of an LED semi-conducting element increases. The light output of an LED for a constant current varies as a function of its junction temperature. Higher ambient temperature leads to higher junction temperatures, which can increase the degradation rate of an LED junction element, possibly causing the light output of an LED to irreversibly decrease over the long term at a faster rate than at lower temperatures. Locating an LED in an insulated and relatively small space, such as the base 42, will likely result in rapidly increased junction temperature and suboptimal performance. However, by mounting the LED 60 on the support 62 which is in physical contact with the base 42, heat can be advantageously removed from the LED by thermal conduction.

With reference to FIG. 3, the red light radiated by the LED 60 is conducted toward the discharge tube arrangement in the outer bulb 20 by the elongated light guide 70. The light guide extends longitudinally from the LED into the volume 22 of the outer bulb 20, an axis of the light guide being generally parallel to an axis of the assembly 10. In the depicted embodiment, the light guide is generally cylindrical, although alternative shapes are contemplated. A light coupling material, such as silicone gel, is located between the LED and light guide to effectively couple light emitted from the LED to the light guide for transmission into the volume 22. A first section 80 of the light guide, which is disposed within the shell 16 and base 42, includes a cup-like member 82 dimensioned to at least partially surround the LED 60. The first section 80 is attached to the support 62 and extends through openings 84, 86 located on the first and second portions 64, 66, respectively. The first section 80 includes a coating to preclude transmission of the light through the sidewall of the light guide or is impermeable to prevent radiation of the red light from the LED through the sidewall of the light guide. This ensures that few irradiation losses occur in the first section 80 so as to provide maximum LED light to the second section 90.

A second section 90 of the light guide extends through an opening 92 located on a wall 94 of the plastic shell 16. The second section 90 is light-permeable and at least partially includes a scattering pattern 96 for mixing the white light emitted by the discharge tubes 14 and the red light emitted by the LED. It should be appreciated that the outer bulb 20 is in the form of a diffuser which also has the function of mixing the light. This mixture of light radiated by the discharge tube arrangement 12 and the red light radiated by the LED 60 provides a substantially homogenous luminance distribution of the assembly 10. Light is desirably distributed along the longitudinal extent of the discharge tube arrangement thus leading to good color mixing along the longitudinal extent.

The LED is preferably designed to be located at the coldest spot of the entire lamp assembly. Preferably, this location is also colder than the cold spot of the discharge tube. Again, currently available high efficiency red LEDs are temperature sensitive. Because the lumen output of the LED decreases significantly upon increasing ambient temperature, positioning the LED at the coldest spot of the lamp assembly contributes to the desired thermal management solution of the present disclosure.

Figure 4:
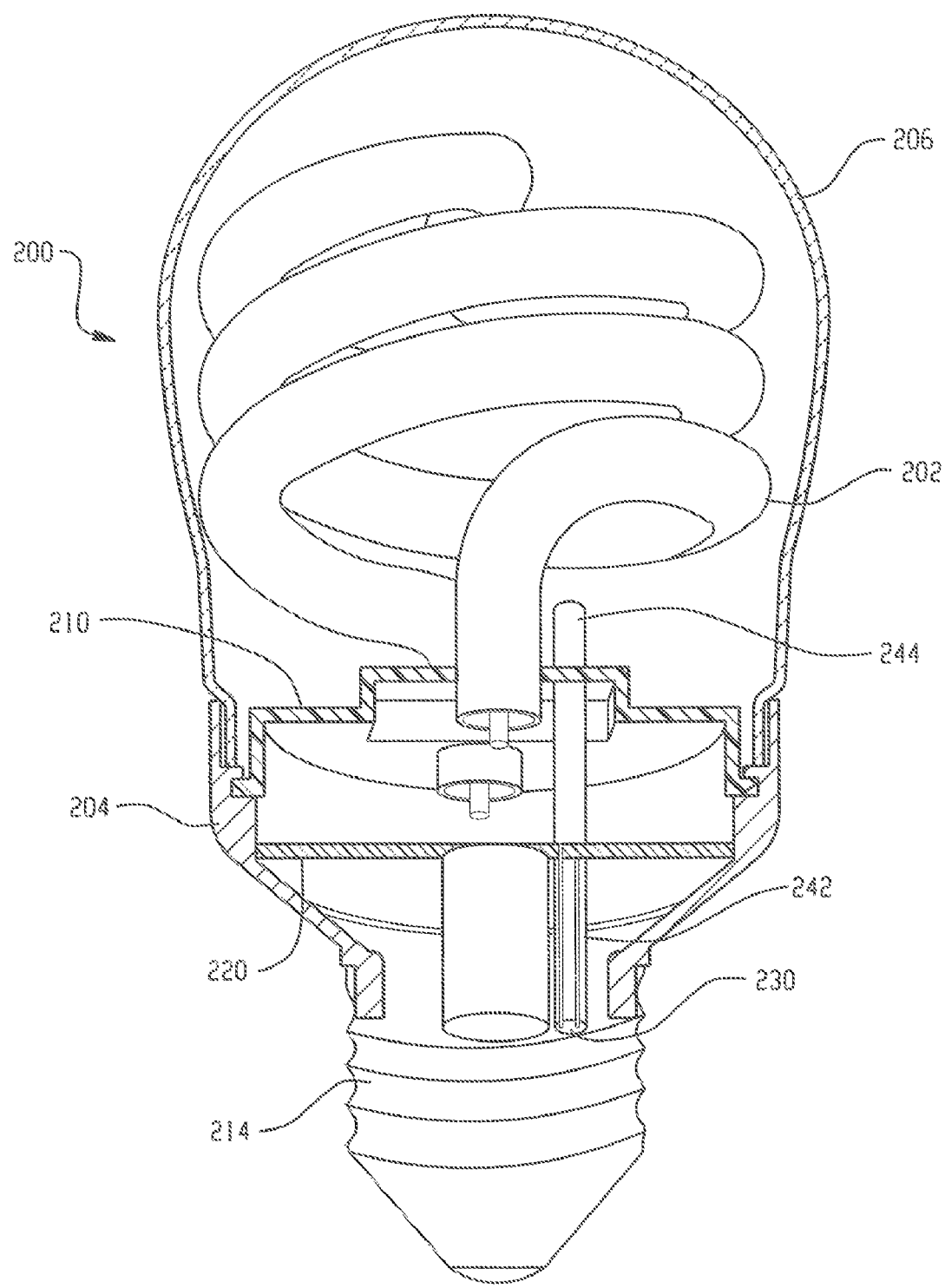
FIG. 4 is a perspective view of an LED integrated fluorescent lamp assembly with selected portions cut away for ease of illustration.
Figure 6:
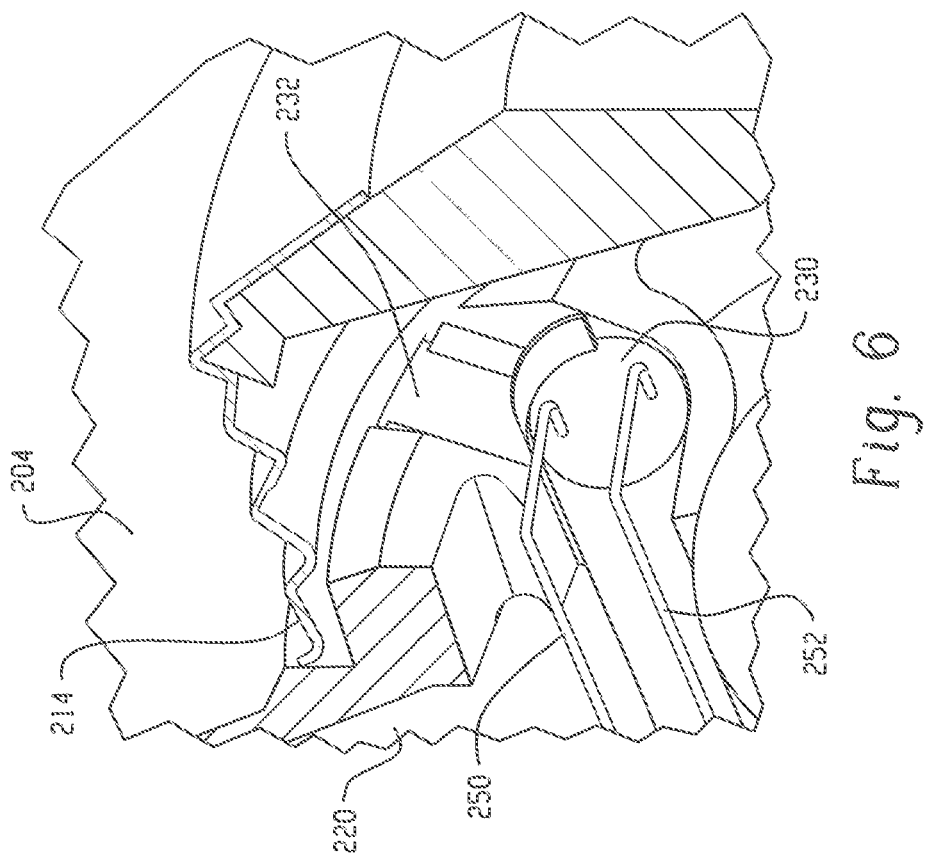
FIG. 6 is a further enlarged view of the LED located in the base portion.
Figure 5:
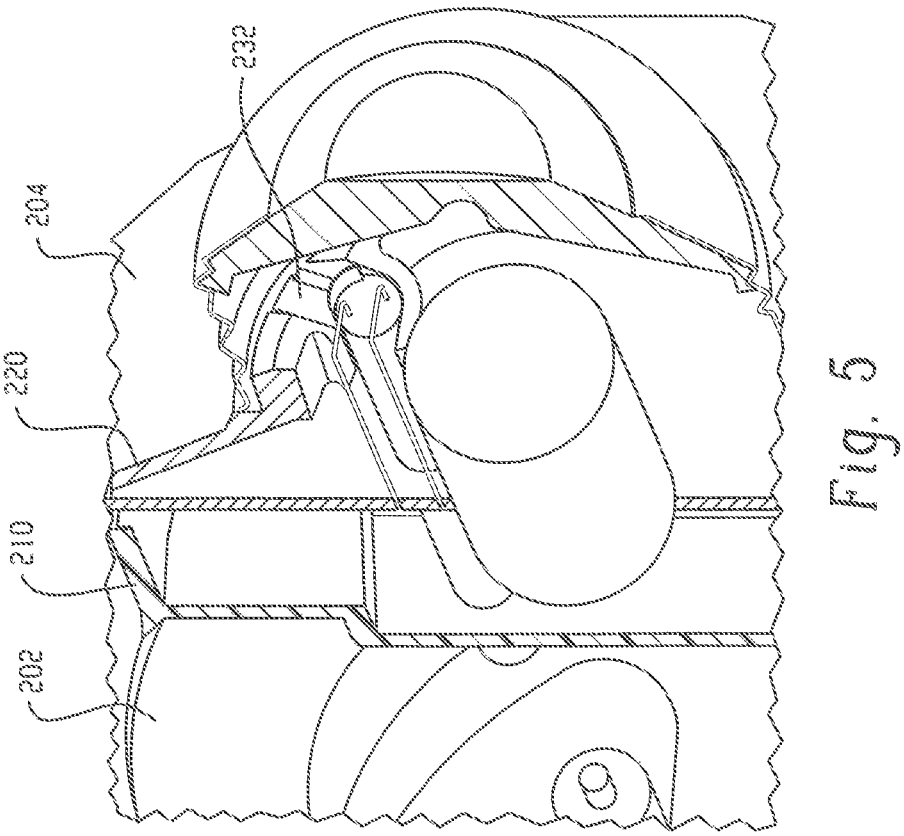
FIG. 5 is an enlarged view of the LED located in a base portion of the fluorescent lamp.

Similar to the aforementioned embodiment, an LED integrated CFL assembly 200 according to another aspect of the present disclosure is shown in FIGS. 4-6. The assembly 200 includes a helical low-pressure fluorescent lamp or discharge tube arrangement 202 attached to a shell or base 204. A glass envelope or outer bulb 206 encompasses the fluorescent lamp. Like the embodiment of FIG. 1, the outer envelope is preferably a light-conducting material. The outer envelope is fixed to the shell 204 by plastic collar 210 that physically separates the fluorescent discharge tube from the lamp ballast assembly housed in the shell 204. An Edison-type threaded metal base 214 is attached to the shell for mechanically and electrically connecting at least the discharge tube arrangement to a lampholder (not shown). Lamp electronics such as electronic ballast 220 is preferably located within the shell 204 to control operation of the light sources, namely LED 230 and the compact fluorescent lamp.

The LED 230 radiates red light and is operatively connected to a heat sink. In this embodiment, strap 232 cooperates with the metal shell 214 to serve as the heat sink for the LED and advantageously conduct heat away from the LED to the outer shell, and so that the heat generated from the LED can be dissipated by conduction. Any suitable conductive material that conducts heat from the LED 230 can serve as a part of the heat sink. By locating the heat sink in the lower inside portion of the base the LED is protected from the operating temperature of the compact fluorescent lamp. The plastic collar 204 and the ballast assembly are interposed between the CFL and the LED to further isolate the LED from the elevated temperatures.

Light guide 240 in this assembly is used to convey the light output of the red light radiated by the LED to the CFL that emits white light. Here, the light guide is supported at axially spaced locations 242, 244 by the ballast assembly 220 and the plastic collar 210. The light guide preferably contains the red light by internal reflection as the red light proceeds through a first or lower portion 242 from the LED located in the base and through the shell. The light guide extends a predetermined dimension above the collar 210 and adjacent the CFL where the red light exits a second or upper portion 244 of the light guide for mixing with the white light of the CFL.

As seen in FIGS. 5 and 6, the LED receives power via first and second conductive leads or wires 250, 252 that extend from the ballast assembly 220 for connection with the LED located at terminal end of the first portion 242 of the light guide. The strap 232 can circumferentially surround at least a portion of the LED to provide effective heat transfer from the LED to the metal base. Thus, the strap provides a support site for the LED and the end of the light guide in addition to functioning as the means to thermally conduct heat from the LED to the base.

Figure 7:
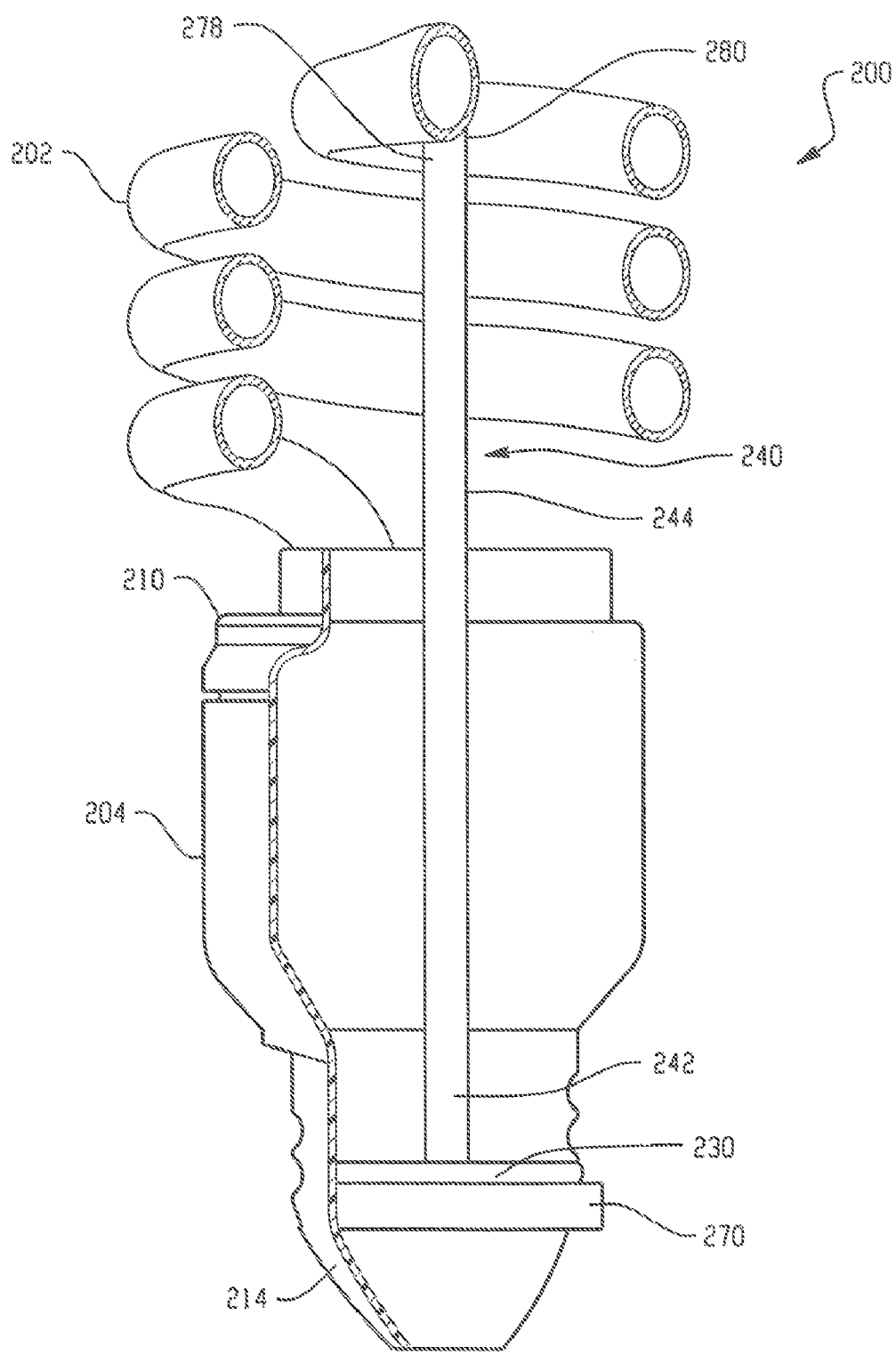
FIG. 7 is an elevational view of another embodiment of an LED integrated fluorescent lamp assembly with selected portions cut away.

The embodiment of FIG. 7 is similar to that of FIGS. 4-6 (and thus like reference numerals identify like components) except where particularly noted otherwise. For example, although the LED is again located in the base, the heat sink includes an additional mass such as brass support ring 270. The brass support ring is preferably an annular member that can serve as a primary component of the heat sink assembly or as an intermediate component between the strap and metal shell. In either arrangement, heat is effectively conveyed from the LED. In addition, the light guide has a height that extends substantially the same height as the height of the CFL. Thus, it will also be appreciated that the elongated light guide extends through the base from adjacent the LED where the light guide receives red light therefrom, passes through a first or upper end of the base, and extends along a major portion of the discharge lamp for intermixing the LED light with the CFL. It may also be desirable to fix a distal or terminal end 278 of the light guide remote from the LED relative to the CFL. In this embodiment, a silicone rubber 280 fixes the distal end 278 of the light guide to the CFL 202. In this manner, the lamp is made more robust since it fixes the light guide against possible movement, has better heat conduction, and is more easily assembled.

Similar to the aforementioned embodiments, an LED integrated CFL assembly 300 according to yet another aspect of the present disclosure is shown in FIGS. 8 and 9. The assembly 300 includes a low-pressure fluorescent lamp or discharge tube arrangement 302 attached to a shell 304. A light transmissive glass or plastic outer envelope 306 encompasses the fluorescent lamp. The outer envelope is fixed to the shell by a collar 310. A plug-in type base 314 is attached to the shell for mechanically and electrically connecting the assembly to a socket or lampholder 316. The lampholder, in turn, is connected to power source (not shown). Lamp electronics such as an electronic ballast (not shown) need not be located within the shell in this embodiment but rather are incorporated into the lampholder. Contact pins 330 disposed on the base are in operative connection with the discharge tube arrangement. Bi-pin connections (not shown) are electrically associated with the ballast to cooperate with the contact pins and supply electric power to the fluorescent lamp 302 as is known in the art. The socket defines a cavity 340 dimensioned to receive the base 314 and contact pins 330.

At least one red light emitting LED 350 is disposed in the socket 316. The red light radiated by the LED is conducted to a vicinity of the discharge tube arrangement 302 in the outer bulb 306 by a light guide assembly 352 (FIG. 8). The light guide assembly extends longitudinally through the socket base 314 to receive light from the LED, extends entirely through shell 304, and directs the red light into a volume 354 of the outer envelope. The light guide assembly may include a first part 360 disposed in the socket 316, and at least includes a portion 362 extending through the base 314 and shell 304, and a third part 364 extending into the outer envelope, for example, preferably along a substantial height of the CFL (and/or between the discharge tubes in this CFL arrangement). The first and second parts are connected via a coupling 370 located on an end of the second part, which is dimensioned to securely receive an end of the first part. A light coupling material, such as silicone gel, is located between the first and second parts to enhance the light transmission therebetween. The first and second parts are configured or include a coating to limit transmission of red light radiating from the LED 350 through the sidewall of the first and second light guide portions. This ensures that minimum irradiation losses occur in the first and second parts so as to provide maximum LED light to the third part. The third part 364, on the other hand, is light-permeable and at least partially includes a scattering pattern 370 for mixing the white light emitted by the discharge tube arrangement and the red light emitted by the LED 350.

The present disclosure provides various solutions to adjust the thermal requirements of the LED. As shown in FIGS. 1-3, one solution is to place the LED 60 at least partially in the base 42 and connect the LED thermally to the base. The light from the LED is conducted to the discharge tubes 4 by the light guide 70. FIGS. 4-7 include variations of this same general arrangement. As shown in FIGS. 8 and 9, yet another solution segregates the LED 350 from the CFL by locating the LED in the socket 316 of the lamp fixture. A light guide assembly 352 having an open end in the base 314 directs the red light radiating from the LED to the fluorescent lamp 302. This is generally a plug-in solution wherein the LED and the fluorescent lamp are driven by an external ballast.

As indicated previously conventional CFLs with LED enhanced color quality have poor lumen maintenance and color stability. The present disclosure provides an innovative solution for producing vivid light and exhibit a very good red color rendering over the entire life span of the lamp. Thus, when energized, the present CFL assembly 10 is easy to differentiate from conventional CFLs. For example, a vivid, very apparent real color is achieved compared to the original CFL light source.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. For example, although the description refers to one LED, it will be recognized that at least one LED (i.e., plural LEDs) may be incorporated into a modified arrangement at a location adjacent the second end of the light guide in order to thermally isolate the LEDs from the discharge lamp. The LED(s) need not necessarily be located in the socket or connected directly to the light guide as in the embodiment of FIGS. 8 and 9, but could be placed outside the lamp, in the socket, in the housing of the supply electronics, coupled thermally with an external heat sink, or a group of LEDs located in a common heat sink with a common power supply and where the light is conducted to the socket, and ultimately adjacent the CFL or into the bulb by a light guide. Moreover, a cladding or coating may not be necessary to limit the amount of light that escapes from the light guide since the air medium surrounding the light guide may be sufficient to minimize the amount of light that escapes.

What is claimed is:

1. A lighting assembly comprising:
   a low pressure discharge lamp radiating light;
   at least one light-emitting diode (LED) emitting light;
   a light guide receiving light from the LED and intermixing the LED light with the discharge lamp light;
   an operating circuit for supplying power to at least the discharge lamp;
   a metal base for mechanically and electrically connecting at least the discharge lamp to an associated lampholder; and
   the at least one LED in thermal conductive relation with the base,
   wherein the light guide includes a first section at least partially located in the base, at least a portion of the first section being substantially light impermeable to prevent radiation of the light from the LED through a sidewall of the light guide, and a second section located in a vicinity of the discharge lamp.

2. The lighting assembly of claim 1 further comprising a heat sink interposed between the light emitting diode and the base.

3. The lighting assembly of claim 2 wherein the LED abuttingly contacts the heat sink, and the heat sink abuttingly contacts the base.

4. The lighting assembly of claim 2 wherein the heat sink is a metal component.

5. The lighting assembly of claim 2 wherein the heat sink supports the light guide.

6. The lighting assembly of claim 5 wherein the heat sink supports the light guide at first and second spaced locations.

7. The lighting assembly of claim 1 wherein the operating circuit also supplies power to the light emitting diode.

8. A lighting assembly comprising:
   a low pressure discharge lamp radiating light;
   a base having a first end from which the discharge lamp extends and a second end spaced therefrom for mechanically and electrically connecting with an associated lampholder;
   at least one light-emitting diode (LED) emitting light adjacent the second end for thermally isolating the LED from the discharge lamp;
   an elongated light guide extending through the base from adjacent the LED and receiving light therefrom, and passing through the base first end and extending along a major portion of the discharge lamp for intermixing the LED light with the discharge lamp light; and
   an operating circuit for supplying power to at least the discharge lamp.

9. The lighting assembly of claim 8 wherein the light guide extends entirely through the base.

10. The lighting assembly of claim 8 wherein the LED is disposed in the base.

11. The lighting assembly of claim 8 wherein the LED is disposed in a socket that selectively connects to the base.

12. The lighting assembly of claim 8 further comprising a heat sink in thermal conductive relation with the light emitting diode and the base.

13. The lighting assembly of claim 8 wherein the light guide is linear and a first end thereof is disposed in the base and a second end terminates adjacent a distal end of the discharge lamp.

14. The lighting assembly of claim 8 wherein the base houses a ballast for operatively driving the discharge lamp.

15. The lighting assembly of claim 14 wherein the ballast is divided from the discharge lamp by a shield.

16. The lighting assembly of claim 8 wherein the LED is located at a second end of the light guide and adjacent the second end of the base.

17. The lighting assembly of claim 8 wherein the LED emits red light and the discharge lamp emits white light.

18. The lighting assembly of claim 8 further comprising an optical interface between the LED and the light guide.

19. The lighting assembly of claim 18 wherein the optical interface includes a material having the same refractive index as the light guide.

20. The lighting assembly of claim 8 wherein the light guide includes means for scattering LED light along the length of the light guide in the region adjacent the discharge lamp only.

21. The lighting assembly of claim 8 further comprising an envelope extending from the base in enclosing relation over the discharge lamp.

22. A lighting assembly comprising:
   a low pressure discharge lamp radiating light;
   at least one light-emitting diode (LED) emitting light;
   a light guide receiving light from the LED and intermixing the LED light with the discharge lamp light, a portion of the light guide at least partially surrounding the LED;
   an operating circuit for supplying power to at least the discharge lamp;
   a metal base for mechanically and electrically connecting at least the discharge lamp to an associated lampholder; and
   the at least one LED in thermal conductive relation with the base.

23. The lighting assembly of claim 22 wherein the portion of the light guide at least partially surrounding the LED includes a cup-like member.

* * * * *